E. H. SCHMIDT.
SHOCK ABSORBING MECHANISM.
APPLICATION FILED MAY 17, 1916. RENEWED MAR. 12, 1919.
1,301,878.
Patented Apr. 29, 1919.
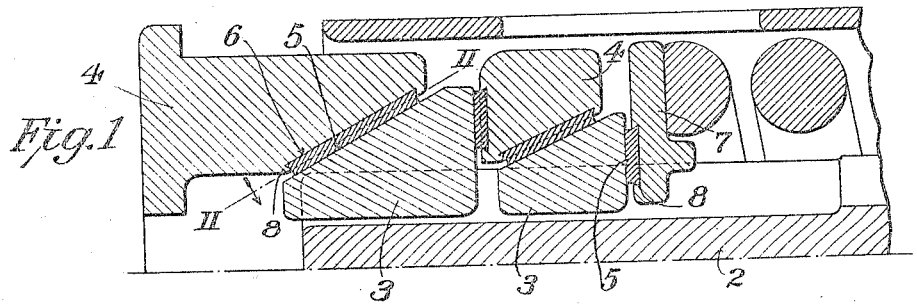
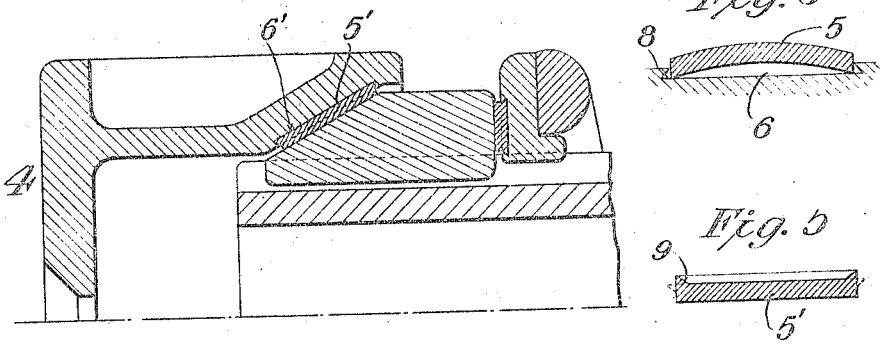
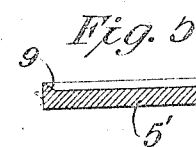
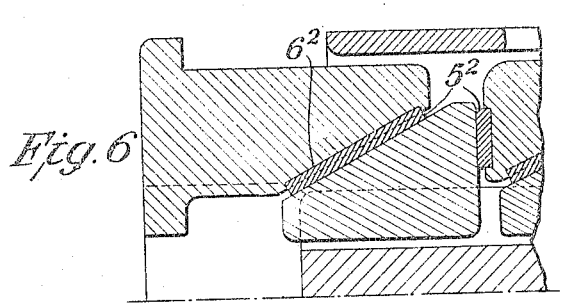
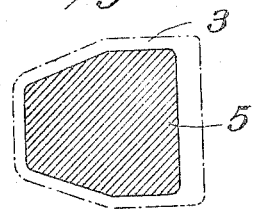
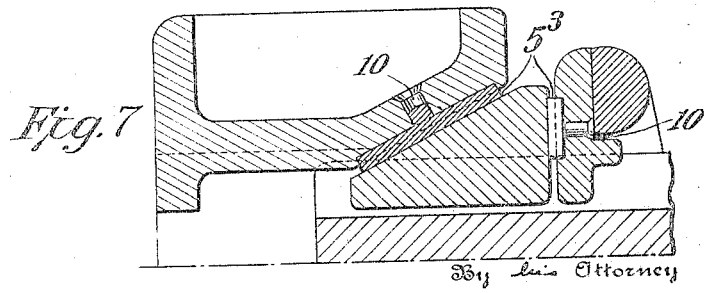
Inventor
Ernest H. Schmidt
By his Attorney

UNITED STATES PATENT OFFICE.

ERNEST H. SCHMIDT, OF LAKEWOOD, OHIO, ASSIGNOR TO THE NATIONAL MALLEABLE CASTINGS COMPANY, OF CLEVELAND, OHIO, A CORPORATION OF OHIO.

SHOCK-ABSORBING MECHANISM.

1,301,878.  Specification of Letters Patent.  Patented Apr. 29, 1919.

Application filed May 17, 1916, Serial No. 98,006. Renewed March 12, 1919. Serial No. 282,197.

*To all whom it may concern:*

Be it known that I, ERNEST H. SCHMIDT, a citizen of the United States, and a resident of Lakewood, Cuyahoga county, Ohio, have invented new and useful Improvements in Shock-Absorbing Mechanisms, of which the following is a specification, reference being had to the accompanying drawings, in which—

Figure 1 is a section showing the application of my improvements to a shock absorbing mechanism of the included friction member type; Fig. 2 is a section on lines 2—2 of Fig. 1; Fig. 3 is a section showing the manner of applying the insert to the part to which it is attached; Fig. 4 is a section of a modified form of my device; Fig. 5 is a section of the insert intended to be applied to the construction of Fig. 4; and Figs. 6 and 7 are sections of further modifications embodying my improvements.

My invention relates to shock absorbing or cushioning mechanism, and is particularly adapted for use in a gear of the type shown in the co-pending application of Chester K. Brooks and Ernest H. Schmidt, Serial Number 93,596, filed April 26, 1916, which has an included friction member, shoes arranged therearound and wedging means adapted to press the shoes against the included friction member and drive them longitudinally thereof, and consists in means for preventing the shoes and wedges from sticking together when the pressure on the gear abates.

Referring to the drawings, in which I have shown my invention applied to a shock absorbing mechanism of the included friction member type, 2 indicates the central friction element, having friction shoes or members 3, arranged between the arms thereof, and held against the friction faces of such arms by means of wedges 4, which encircle the friction element 2. To prevent the wedges and shoes from sticking together when the rigging is relieved from the pressures of buffing and draft, I provide soft metal inserts or pads 5, preferably made of brass, or similar metal, which I have shown as being seated in recesses or depressions 6 in the wedges 4, and follower 7, and bearing on the friction shoes 3. I have shown the edges of the recess 6 undercut at 8, so as to afford an anchorage in the wedge 4 or follower 7 for the insert.

Where the arms of the central friction member are tapered, it is obvious that there is relative movement between the shoes and wedges or followers in buffing and in draft and as the insert or pad is of softer material than the member upon which it bears, there will be a tendency of the harder material to cut into the softer. To obviate such tendency, the bearing face of the insert or pad is made of lesser extent than the coöperating face on the opposing member, so that the harder member will not cut into the face of the insert or pad, as is best shown in Fig. 2, in which the shoe 3 is indicated as having its edges extended out beyond the edges of the insert or pad.

As is shown in Fig. 3, the insert 5 is shown as being formed of cup-shape. It is applied by placing it in the recess 6 in the wedge 4, and by flattening it out under pressure so that it expands in the recess and forms a secure interlock with the metal of the part to which it is attached.

In Fig. 5 the pad or insert 5' is shown with a flange 9, which is inserted in the recess, and which, when pressure is applied, will expand outwardly, as is shown in dotted lines to dovetail in the undercut portion of the recess or depression. When secured in the member the flange 9 will fill the undercut sides of the recess 6', as is indicated in Fig. 4.

In Fig. 6 I have shown the depressions or recesses $6^2$, formed without undercut edges or sides, and the inserts $5^2$ are held in position by the tightness of their fit and by their bearing upon the opposing faces of the shoes.

In Fig. 7 I have shown the inserts $5^3$ as being formed with stems 10, which are riveted over, as shown.

In each instance it is to be observed that the pad is sunk into the part to which it is attached in such manner as to obtain the greatest amount of metal to resist shear stresses.

My invention is of particular advantage in securing a positive release of the wedges from the shoes, in a gear of the type described, when the gear is subjected to heavy shocks, since it overcomes a tendency on the part of the wedges and shoes to stick together, even after the pressure is entirely relieved.

Other advantages are that the anti-friction quality of the inserts allows an easy disengagement between wedges and shoes at the moment of release, and that where made of brass, aluminum or similar non-corrodible metal the inserts will not only not rust, which might cause the wedges and shoes to stick together and become unreliable in operation, but also the brass, as it wears off from the inserts, forms a fine layer on the wedging faces of the shoes, which materially aids in preserving smooth surfaces thereon.

The terms and expressions which I have employed are used as terms of description and not of limitation, and I have no intention, in the use of such terms and expressions, of excluding any mechanical equivalents for the features shown and described, but recognize that various modifications may be made within the scope of the invention claimed.

What I claim is:

1. In frictional shock absorbing mechanism, a friction element, friction members arranged about said friction element and in friction engagement therewith, and having wedging non-friction faces, a wedge member engaging the non-friction faces of the friction members, and a soft metal member interposed between the wedge member and the non-friction face of a friction member spacing said members apart, the softer metal member seating in a recess in one of said members, and being adapted to prevent said members from sticking together as the pressure abates.

2. In frictional shock absorbing mechanism, a friction element, a plurality of friction members arranged about said friction element and in frictional engagement therewith, each friction member having an inclined wedging non-friction face, a wedge member having an inclined wedging face, a soft metal insert arranged between the wedging face of each friction member and an inclined face of the wedge and secured in a recess in one of said members, said insert spacing apart said friction member and wedge and maintaining them out of contact with each other in all positions to prevent them from sticking together upon release and to prevent the opposing faces thereof from cutting into each other.

ERNEST H. SCHMIDT.